US008232362B2

(12) United States Patent
Yang et al.

(10) Patent No.: US 8,232,362 B2
(45) Date of Patent: *Jul. 31, 2012

(54) PREPARATION OF AMINO-SILANE TERMINATED POLYMER BY USING ORGANIC BISMUTH CATALYST AND CURED POLYMER THEREFROM BY USING NON-TIN CATALYST

(75) Inventors: Yurun Yang, Shanghai (CN); Misty Huang, New City, NY (US)

(73) Assignee: Momentive Performance Materials Inc., Albany, NY (US)

( * ) Notice: Subject to any disclaimer, the term of this patent is extended or adjusted under 35 U.S.C. 154(b) by 1960 days.

This patent is subject to a terminal disclaimer.

(21) Appl. No.: 11/227,919

(22) Filed: Sep. 15, 2005

(65) Prior Publication Data

US 2007/0060732 A1    Mar. 15, 2007

(51) Int. Cl.
C08G 18/10    (2006.01)
C08G 18/22    (2006.01)
C08G 18/38    (2006.01)
C08G 18/48    (2006.01)
C08G 18/71    (2006.01)

(52) U.S. Cl. .............................. 528/19; 528/28; 528/38
(58) Field of Classification Search .................. 528/19, 528/28, 38, 36
See application file for complete search history.

(56) References Cited

U.S. PATENT DOCUMENTS

| 3,627,722 | A |   | 12/1971 | Seiter |
|---|---|---|---|---|
| 3,829,505 | A |   | 8/1974 | Herold |
| 3,941,849 | A |   | 3/1976 | Herold |
| 4,242,490 | A |   | 12/1980 | Emerson et al. |
| 4,335,188 | A |   | 6/1982 | Igi et al. |
| 4,687,851 | A |   | 8/1987 | Laughner |
| 4,985,491 | A |   | 1/1991 | Reisch |
| 5,095,045 | A | * | 3/1992 | Winkel et al. ............ 523/115 |
| 5,096,993 | A |   | 3/1992 | Smith et al. |
| 5,100,997 | A |   | 3/1992 | Reisch et al. |
| 5,106,874 | A |   | 4/1992 | Porter et al. |
| 5,116,931 | A |   | 5/1992 | Reisch et al. |
| 5,136,010 | A |   | 8/1992 | Reisch et al. |
| 5,185,420 | A |   | 2/1993 | Smith et al. |
| 5,266,681 | A |   | 11/1993 | Reisch et al. |
| 5,990,257 | A | * | 11/1999 | Johnston et al. ............ 528/28 |
| 6,001,214 | A |   | 12/1999 | Hsieh et al. |
| 7,365,145 | B2 | * | 4/2008 | Yang et al. ............ 528/29 |
| 2003/0225237 | A1 | * | 12/2003 | Roesler et al. ............ 528/28 |
| 2004/0132950 | A1 | * | 7/2004 | Roesler et al. ............ 528/28 |
| 2005/0119436 | A1 | * | 6/2005 | Ziche et al. ............ 528/29 |
| 2006/0173140 | A1 | * | 8/2006 | Roesler et al. ............ 525/474 |

FOREIGN PATENT DOCUMENTS

| EP | 0410199 | 1/1991 |
|---|---|---|
| EP | 1535940 | 6/2005 |

* cited by examiner

*Primary Examiner* — Rabon Sergent
(74) *Attorney, Agent, or Firm* — Dominick G. Vieari; Joseph S. Ostroff

(57) ABSTRACT

The present invention relates to a process for preparing silylated isocyanato-terminated polyurethane prepolymer which have increased stability toward atmospheric moisture, in the presence of at least one catalyst selected from the group consisting of bismuth and zinc compounds.

23 Claims, No Drawings

PREPARATION OF AMINO-SILANE TERMINATED POLYMER BY USING ORGANIC BISMUTH CATALYST AND CURED POLYMER THEREFROM BY USING NON-TIN CATALYST

FIELD OF THE INVENTION

The present invention relates to silyl-functionalized polymers compositions with increased stability toward atmospheric moisture. More particularly, this invention related to the preparation moisture curable silylated isocyanato-terminated polyurethane prepolymer compositions with out tin catalysts by using reduced toxicity alternatives in products that are suitable for use as sealants, adhesives and coatings.

BACKGROUND OF THE INVENTION

Moisture-crosslinkable formulations are well known, particularly those, which are based on silyl-functionalized polymers. The silyl-functionalized polymers are prepared by conventional methods. One example is the reaction of polymers that have end groups having active hydrogen with isocyanates, particularly isocyanatoalkylalkoxysilanes. Another example is the reaction of isocyanate terminated polyurethane prepolymer with aminosilane. The reaction may be carried out with or without catalysts, which promote isocyanate reaction.

Silane condensation catalysts include numerous compounds, for example dialkyltin compounds such as dibutyltin dilaurate; various metal complexes (chelates and carboxylates), for example of titanium, bismuth, zirconium, amines and salts thereof; and other known acidic and basic catalysts as well. Known catalysts which promote the isocyanate reaction with hydroxyl groups are often those which also promote silane condensation, for example dialkyltin compounds and metal complexes (chelates and carboxylates) of bismuth and zinc, or tertiary amine compounds.

The disadvantage of all known processes for preparing silane-crosslinkable polymers is due to the fact that the polymers have to be handled under conditions including exclusion of moisture. In industrial practice this is associated with a high degree of complexity and is therefore expensive.

Accordingly, it is an object of the present invention to provide moisture curable silylated isocyanato-terminated polyurethane prepolymer compositions with out tin catalysts by using reduced toxicity alternatives in products that are suitable for use as sealants, adhesives and coatings.

SUMMARY OF THE INVENTION

One embodiment of the present invention provides a process for making moisture curable silylated polyurethane resin comprising reacting isocyanato-terminated polyurethane prepolymer derived from polyether polyol, with an aminoalkoxysilane—in the presence of at least one urethane reaction promoting catalyst selected from the group consisting of bismuth and zinc compounds.

In another embodiment of the present invention provides a moisture curable silylated isocyanato-terminated polyurethane prepolymer composition wherein the composition contains at least one curing catalyst selected from the group consisting of bismuth, zinc, aluminum, and titanium compounds.

In yet another embodiment of the present invention a moisture curable composition is provided comprising a silylated isocyanato-terminated polyurethane prepolymer and at least one curing catalyst selected from the group consisting of bismuth, zinc, aluminum, and titanium compounds.

DETAILED DESCRIPTION OF THE INVENTION

The invention provides a process for preparing moisture curable silylated polyurethane resin by reacting isocyanato-terminated polyurethane prepolymer derived from polyether polyol with an aminoalkoxysilane in the presence of at least one urethane reaction promoting catalyst selected from the group consisting of bismuth and zinc compounds. In the inventive process, the urethane reaction-promoting catalyst, e.g. bismuth, may be used through out the entire process for the preparation silylated polyurethane.

Preparation of the isocyanato-terminated polyurethane prepolymer is well established in the art. A wide range of polyisocyanates, or isocyanato-terminated polyurethane prepolymers, or mixtures thereof, may be used in the process of the present invention. In one embodiment of the present invention, the polyisocyanates are diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, and combinations thereof. Also useful are other polyisocyanates such as isophorone diisocyanate, dicyclohexylmethane-4,4'-diisocyanate, toluene diisocyanate ("TDI"), particularly the 2,6-TDI isomer, as well as the various other aliphatic and aromatic polyisocyanates that are well-established in the art, and combinations thereof.

The isocyanato-terminated polyurethane prepolymers particularly suitable for use in the process of the present invention are the MDI prepolymers, such as the prepolymers of MDI a mixture of tripropylene glycol (TPG) and dipropylene glycol (DPG) [commercially available as ISONATE 181], the prepolymers of MDI with 400 to 700 molecular weight diols, the prepolymers of MDI with 4,500 to 6,500 molecular weight triols, as well as the prepolymers of MDI reacted with the high molecular weight polyols utilized in the process of the present invention. (Aromatic diisocyanates, such as, tolylene 2,4-diisocyanate (2,4-TDI), diphenylmethane 2,4'-diisocyanate, 2,6-diisocyanate (TDI) 4,4'-methylene diphenyldiisocyanate (MDI); 2,4'-methylene diphenyldiisocyanate (MDI); polymeric methylene diphenyldiisocyanate (PMDI) p-phenylene diisocyanate (PDI), maththanlene-1,5-diisocyanate (NDI), tetramethylxylene diisocyanate (TMXDI), and the like, and aliphatic diisocyanates such as isophorone diisocyanate (IPDI), 1,6-hexamethylene diisocyanate (HDI), 2-butyl-2-ethylpentamethylene diisocyanate, 2-isocyanatopropylcyclohexyl isocyanate, 3-isocyanatomethyl-1-methyl-1-isocyanatocyclohexane, lysine alkyl ester diisocyanate, 4,4'-dicyclohexylmethane diisocyanate (H12MDI)1,4-cyclohexane diisocyanate (CHDI), bis(isocyanatomethyl)cyclohaxane (H6XDI), and the like are contemplated herein.

The moisture curable silylated polyurethane polymers of the present invention may be prepared with polyether polyols, polyester polyols, polyetherester polyols, polyesterether polyols, polyolefin polyols, polycaprolactone and even polyacylate polyols, hydroxyl-terminated hydrocarbon polymers, e.g. those obtained from butadiene, or other polyol compounds. Other polyols contemplated herein include polyols like polyhydroxy polycarbonates, polyhydroxy polyacetals, polyhydroxy polyacrylates, polyhydroxy polyester amides and polyhydroxy polythioethers, polyolefin polyols and low molecular polyol like glycol, triethylene glycol, propylene glycol, butanediol, hexylene glycol, trimethylol propane, 1,2,6-hexanetriol, 1,2,4-butanetriol, trimethylol ethane, pentaerythritol, mannitol, sorbitol, sucrose or/and alkylol amines such as diethanolamine, triethanolamine, and the like.

Suitable polyols include polyoxyalkylene (especially polyoxyethylene, polyoxypropylene, and polyoxybutylene) diols, polyoxyalkylene triols, polytetramethylene glycols, polyacetals, polyhydroxy polyacrylates, polyhydroxy polyester amides and polyhydroxy polythioethers, polycaprolactone diols and triols, and the like. Other polyol compounds, including tetraols, hexaols, alkoxylated bisphenols or polyphenols, and various sugars and derivatives thereof may also be used, including pentaerythritol, sorbitol, mannitol and the like. In one embodiment of the present invention, the polyols used in the production of isocyanate-terminated polyurethane prepolymers are polypropylene glycols with equivalent weights between about 500 and 25,000. In another embodiment of the present invention, the polyols used in the production of isocyanate-terminated polyurethane prepolymers are polypropylene glycols with equivalent weights between about 1,000 to 20,000. Mixtures of polyols of various structures, molecular weights and/or functionalities may also be used.

The polyether polyols may have a functionality up to about 8 but preferably have a functionality from about 2 to 4. The polyetherpolyols preferably are diols, triols, or combinations of both. The polyether polyol preferably is prepared in the presence of a double-metal cyanide (DMC) complex catalyst, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420, and 5,266,681, incorporated here by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of 1,000 to 25,000, more preferably 2,000 to 20,000, and even more preferably 4,000 to 18,000. The polyether polyols preferably have an end group unsaturation level of no greater than 0.04 milliequivalents per gram of polyol. More preferably, the polyether polyol has an end group unsaturation of no greater than 0.02 milliequivalents per gram of polyol. A polyether diol typically is of the formula

where R is an alkyl group having 1 to 6 carbon atoms such as ethyl, propyl, butyl, and isopropyl. $R^1$ independently represents hydrogen or R, and x is an integer of about 1 to 350. Preferred diols include polyisopropylene oxide, polytetramethylene oxide, polyisobutyl oxide, and combinations thereof. Examples of commercially available diols that may be suitable include ARCOL R-1819 (molecular weight (MW) 8,000), E-2204 (MW 4,000), and ARCOL E-2211 (MW 11,000). These diols are available from ARCO Chemical Company of Newtown Square, Pa. A polyether triol may be represented by the formula

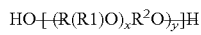

where R, $R^1$, and x are as described above, $R^2$ represents an alkyl group that contains 1 to 6 carbon atoms and that has a pendant hydroxyl group, and y is 1. A preferred polyether triol is polyisopropylene oxide such as ARCOL E-2306 (MW 6,000).

Examples of suitable aminoalkylsilanes of the present invention include, but are not limited to, aminopropyltriethoxysilane, aminopropyltrimethoxysilane, aminobutyltriethoxysilane, N-(2-aminoethyl-3-aminopropyl)triethoxysilane, ɯ-aminoundecyltrimethoxysilane, and aminopropylmethyldiethoxysilane, for example. Other suitable aminosilanes include, but are not limited to phenyl amino propyl trimethoxy silane, methyl amino propyl. trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted 4-amino 3,3-dimethyl butyl trimethoxy silane, amino propyl triethoxy silane and mixtures thereof, specific examples of which include N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy)propyltrimethoxysilane, N-ethyl-4-amino-3,3-dimethylbutyidimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N,N-bis[(3-triethoxysilyl)propyl]amine, N,N-bis[(3-tripropoxy-silyl) propyl]amine, N-(3-trimethoxysilyl)propyl-3-[N-(3-trimethoxysilyl)-propylamino]propionamide, N-(3-triethoxysilyl)propyl-3-[N-3-triethoxysilyl]-propylamino] propionamide, N-(3-trimethoxysilyl)propyl-3-[N-3-triethoxysilyl]-propylamino]propionamide, 3-trimethoxysilylpropyl 3-[N-(3-trimethoxysilyl)-propylamino]-2-methyl propionate, 3-triethoxysilylpropyl 3-[N-(3-triethoxysilyl)-propylamino]-2-methyl propionate, 3-trimethoxysilylpropyl 3-[N-(3-triethoxysilyl)-propylamino]-2-methyl propionate, gamma-mercaptopropyl-trimethoxysilane and N,N'-bis((3-trimethoxysilyl)propyl) amine.

Useful commercially available aminosilanes include, e.g., aminosilanes available under the SILQUEST series of trade designations including, e.g., SILQUEST A-1170, SILQUEST A-1110, SILQUEST Y-9669 and SILQUEST A-15 from the General Electric Company, under the DYNASYLAN series of trade. designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.).

Suitable urethane reaction-promoting catalyst catalysts of the present invention to prepare moisture curable silylated polyurethane resin include, but are not limited to zinc acetylacetonate, bismuth(2-ethylhexanoate), bismuth neodecanoate, zinc 2-ethylhexanoate, zinc neodecanoate and bismuth tetramethylheptanedioate, and mixtures thereof. In one embodiment of the present invention, the catalyst is organobismuth or zinc compound. In another embodiment of the present invention, the catalyst is bismuth octoate-caprate, bismuth 2-ethylhexanoate, bismuth neodecanoate, zinc 2-ethylhexanoate, zinc neodecanoate, aluminum and/or titanium compounds, or mixtures thereof. In yet another embodiment of the present invention the catalyst is organobismuth carboxylic acid.

Examples of commercially available catalysts suitable as cure catalysts include but are not limited to Coscat® 83: organobismuth catalyst with bismuth content 16.5% from CasChem Company. Other commercially available bismuth catalysts are Coscat® 16, Coscat® 28, Coscat® Z-22 (CasChem Company); Borchi® Kat 22, Borchi® Kat VP 0243, Borchi® Kat VP 0244 (Borchers GmbH), the BICAT® types (Shepherd Chemical Company, USA) and K-Kat® K-348 (King Industries, Inc.). K-KAT XC6212: Zirconium complex with metal content 0.35% from King Industry, Inc. (Alternative: K-KAT XC-A209 (3.0% Zr)).K-KAT 5218: Aluminum chelate with metal content 4% from King Industries. (alternative: K-KAT 4205 (<0.1% Zr)). TYZER® GBA: titanic chelate with $TiO_2$ content 16.5% from Dupont. Other commercially available titanic catalysts includes TYZER® types from Dupond & KR types from Kenrich.

In one embodiment of the present invention, the urethane reaction-promoting catalysts to prepare moisture curable silylated polyurethane resin are used in amounts of from 0.0005 to 1.0 part by weight, based on 100 parts by weight of the polyol of the formula. In another embodiment of the present invention, the catalysts are used in amounts from 0.001 to 0.5 part by weight, based on 100 parts by weight of the polyol of the formula.

In one embodiment of the present invention, the process to prepare moisture curable silylated polyurethane resin is carried out at temperatures of from 0 to 150 C°. In another embodiment of the present invention, the process is carried out at temperatures of from 30 to 120 C°, and at a pressure of the surrounding atmosphere, i.e. from about 900 to 1100 hPa.

In one embodiment of the present invention, the above mentioned catalysts are also suitable for curing silylated polyurethane resin as curing catalysts. The catalysts are used in amounts of from 0.01 to 2.0 parts by weight, based on 100 parts by weight of the silylated polyurethane resin of the formula. In another embodiment of the present invention, the catalysts are used in amounts from 0.05 to 1.5 parts by weight, based on 100 parts by weight of the silylated polyurethane resin of the formula.

The inventive process has the advantage that it is rapid and simple to carry out, and it has been found that the silylated polyurethane polymers prepared by the process are stable toward atmospheric moisture and do not need a tin catalyst for silylated polyurethane cure, which reduces the potential for environmental toxicity considerably.

In one embodiment of the present invention, other substances optionally used may be included in the silylated polyurethane compositions, such as, for example, fillers, additives, for example adhesion promoters, UV stabilizers, antioxidants, pigments and siccatives, crosslinkers such as alkoxysilanes, plasticizers, for example phthalates, polyethers and polybutenes, more preferably adhesion promoters, fillers and plasticizers.

Examples of optional fillers are nonreinforcing fillers, i.e. fillers having a BET surface area of up to 50 m.sup.2/g, such as quartz, diatomaceous earth, calcium silicate, zirconium silicate, zeolites, metal oxide powder such as aluminum oxides, titanium oxides, iron oxides or zinc oxides, or mixed oxides thereof, barium sulfate, calcium carbonate, gypsum, silicon nitride, silicon carbide, boron nitride, glass and plastic powder, such as polyacrylonitrile powder; reinforcing fillers, i.e. fillers having a BET surface area of more than 50 m.sup.2/g such as pyrogenic silica, precipitated silica, carbon black such as furnace black and acetylene black, and silicon-aluminum mixed oxides of large BET surface area; fibrous fillers such as asbestos and carbon fibers.

Examples of optional additives are adhesion promoters such as aminopropyltrimethoxysilane and aminoethylaminopropyltriethoxysilane, UV stabilizers and antioxidants, for example those commercially available under the name Tinuvin.RTM. 292, Tinuvin® 327 and Tinuvin® 770 from Ciba Spezialitatenchemie Lampertsheim GmbH, pigments such as iron oxide, and siccatives such as trimethyl carbonate, vinyltrimethoxysilane and O-methyl N-trimethoxysilylcarbamate. Additives are preferably used in amounts of from 1 to 200 parts by weight, more preferably from 10 to 100 parts by weight, based in each case on 100 parts by weight of silylated polyurethane.

Examples of crosslinkers are compounds having at least three hydrolyzable groups, such as acetoxy, oximato, and organyloxy groups such as ethoxy radicals, alkoxyethoxy radicals and methoxy radicals, preference being given to compounds having organyloxy groups.

In one embodiment of the present invention the crosslinkers are alkoxysilanes such as vinyltrimethoxysilane, methyltrimethoxysilane, propyltrimethoxysilane, O-methyl N-trimethoxysilylcarbamate and O-methyl N-dimethoxy(methyl) silyl-carbamate and/or partial hydrolyzates thereof. In another embodiment of the present invention, the crosslinkers are vinyltrimethoxysilane and O-methyl N-trimethoxysilyl-carbamate. The crosslinkers are used in amounts of from 0.1 to 10 parts by weight, more preferably from 1 to 5 parts by weight, based in each case on 100 parts by weight of silylated polyurethane.

Examples of plasticizers are phthalates, polyethers and polybutenes, preference being given to phthalates and polyethers. When incorporating plasticizers, the amounts are preferably from 1 to 200 parts by weight, more preferably from 10 to 100 parts by weight, based in each case on 100 parts by weight of silylated polyurethane.

The individual components may be mixed together in any sequence by means of apparatuses which are familiar to those skilled in the art for this purpose, for example dissolvers, planetary dissolvers, planetary mixers and twin-screw kneaders.

It has been found that the silylated polyurethane polymers prepared by the process are stable toward atmospheric moisture. The inventive process has the advantage that the moisture-curable silylated polyurethane can be mixed with fillers and additives as received and then dryed as well mixed blends. This process is less complex as compared to the common process that pre-drys all fillers and additives and then mixes them with the silylated polyurethane. As such, simplified production and storage is readily possible.

The compositions of the present invention may be used for all purposes for which silylated polyurethane compositions curable at room temperature by condensation/hydrolysis reaction are useful. They therefore have outstanding suitability, for example, as sealing compositions or as adhesives, and also for producing protective coatings.

In the examples described below, all specifications of parts with percentages, unless stated otherwise, are based on weight. Furthermore, all viscosity data relate to a temperature of 25 C. Unless stated otherwise, the examples which follow are carried out at a pressure of the surrounding atmosphere, i.e. at about 1000 hPa, and room temperature, i.e. about 25° C., or at a temperature which is established when the reactants are combined at room temperature without additional heating or cooling.

EXAMPLES

As used in these examples, the following designations, terms, and abbreviations shall have the following meanings:
Polypropylene Glycols (polyols):
Accliam® 4200: polyether polyol with fn=2, Mn=4,000 sold by Bayer Corporation.
Acclaim® 8200: polyether polyol with fn=2, Mn=8,000 sold by Bayer Corporation;
GSE® 2120: polyether polyol with fn=2, Mn=12,000 sold by Shanghai Gaoqiao Petrochem Isocyanates:
Desmodur®M-0129: MDI with about 55% 2,4-MDI & 45% 4,4-MDI, sold by Bayer Corporation. IPDI: isophorone diisocyanate sold by Degussa;
Silanes:
Silquest® A-Link15, N-ethyl-3-trimethoxysilyl-2-methyl-propanamine sold by General Electric Company, Silquest® A-Link 35, 3-isocyanatopropyltrimethoxy silane sold by General Electric Company, Silquest® A-1120: N-(beta-aminoethyl) gamma-aminoprophyltrimethoxy silane sold by General Electric Company.
Catalysts:
Formerz SUL-4: Dibutyltin dilaurate, sold by General Electric Company.
Coscat® 83: organobismuth catalyst with bismuth content 16.5% sold by CasChem Company, K-KAT 5218: Aluminum chelate with metal content 4% sold by King Industries, Inc., USA TYZER® GBA: titanic chelate with $TiO_2$ content 16.5% sold by the Dupont Company, K-KAT XC6212: Zirconium complex with metal content 0.35%, sold by King Industries, Inc., USA.

A series of silylayted polyurethane (SPUR) prepolymers were prepared by using the catalyst bismuth (Coscat® 83) and dibutyltin dilaurate (DBTDL), respectively, as listed in Table 1 (A-F), to compare the effect of two catalysts. The prepolymers in Examples A through F were synthesized according to the formulations in Table 1 by the following two-step process.

Two-step synthesis process: Charge kettle with the diol(s). Heat the kettle to 60° C. with stirring and sparge with nitrogen gas in a moderate flow. Continue this drying process overnight or until the moisture concentration is less than 200 ppm by Karl Fisher titration. Cool down the kettle to 30° C. and add catalyst to the reactor using a GC syringe or auto pipet. After the catalyst has been well mixed, add the isocyanates and begin heating. The temperature was maintained at 65° C. and monitors the isocyanate content by titration. When isocyanate (NCO) content was reached capping point add the silane capping agent and continue to run the reaction at 65° C. until no free NCO could be detected.

TABLE 1

| | Examples | | | | | |
|---|---|---|---|---|---|---|
| | A | B | C | D | E | F |
| Acclaim 4200 | 100 | 100 | | | | |
| Acclaim 8200 | | | 100 | 100 | | |
| GSE 2120 | | | | | 100 | 100 |
| M-0129 | 8.74 | 8.74 | | | | |
| IPDI | | | 3.7 | 3.7 | 0.9 | 0.9 |
| Formez SUL-4 | 5.6 ppm | | 8 ppm | | 10 ppm | |
| Coscat 83 | | 9.5 ppm | | 10 ppm | | 10 ppm |
| Capping point | 0.67% | 0.67% | 0.33% | 0.33% | 0.03% | 0.03% |
| Silquest A-Link15 | 4.5 | 4.5 | 1.8 | 1.8 | | |
| Silquest A-Link35 | | | | | 2 | 2 |

In order to evaluate the stability of the prepolymers toward moisture, the prepolymer samples were transferred to round plastic dishes (diameter 5 cm, fill height approx. 0.5 cm) and stored at 23° C. and 50% relative atmospheric humidity. The viscosity of the prepolymer was subsequently determined. The results were listed in Table 2. From the results listed in Table 2, it can be seen that the viscosity of prepolymer by using SUL-4 increases undesirably and the polymer finally gels within 3 weeks. Whereas, the viscosity of prepolymer made from Coscat 83 only slightly to moderately increases after three (3) weeks.

The prepolymers (examples A-F) were blended with 1% of bismuth catalyst (Coscat 83) and 1% of tin catalyst (SUL-4), respectively, and cured in the 50° C./50% relative humidity chamber for seven (7) days. Experiments indicate that all samples cure very well under this condition. The tack free time and the mechanical properties of these silylated polyurethane prepolymers (Examples A-F) are listed in Table 3. The results indicate that the prepolymers cured by Coscat 83 have longer tack free time than SUL-4 implying that bismuth catalyst has lower catalytic power than tin catalyst for silane condensation. The prepolymers that were synthesized by using Coscat 83 (Examples B, D and F) had a slightly higher hardness and a little lower elongation than the prepolymer using SUL-4.

TABLE 3

| Example | Catalyst for curing | Hardness (shoreA) | Tensile strength (psi) | Elongation (%) | Tack free time |
|---|---|---|---|---|---|
| A | SUL-4 | 23.5 | 138 | 152 | 3 hr |
| B | SUL-4 | 27.8 | 134 | 112 | 5 hr |
| B | Coscat 83 | 28.9 | 123 | 97 | 24 hr |
| C | SUL-4 | 8 | 79 | 363 | 3.5 hr |
| D | SUL-4 | 8 | 81 | 325 | 5 hr |
| D | Coscat 83 | 7 | 77 | 335 | 24 hr |
| E | SUL-4 | 6 | 50 | 293 | 2.5 hr |
| F | SUL-4 | 7 | 57 | 213 | 3 hr |
| F | Coscat 83 | 6 | 45 | 178 | 24 hr |

TABLE 2

Viscosity change of silylated polyurethane prepolymers upon exposure to atmospheric moisture.

| | Time (days) | | | | | | | | |
|---|---|---|---|---|---|---|---|---|---|
| Example | 0 | 1 | 3 | 4 | 8 | 11 | 15 | 18 | 21 |
| | | | | | Viscosity (cps) | | | | |
| A | 141,000 | 141,000 | 132,000 | 136,000 | 140,000 | 180,000 | 288,000 | 475,000 | gel |
| B | 130,000 | 131,000 | 132,000 | 130,00 | 127,000 | 137,000 | 160,000 | 173,000 | 182,000 |
| C | 68,000 | 68,000 | 80,000 | 87,000 | 128,000 | 182,000 | 289,000 | 420,000 | gel |
| D | 50,000 | 53,000 | 56,400 | 61,600 | 73,900 | 87,900 | 110,000 | 133,000 | 149,000 |
| E | 43,000 | 43,000 | 60,300 | 71,900 | 185,000 | gel | | | |
| F | 42,000 | 42,000 | 41,000 | 41,600 | 43,000 | 45,000 | 45,400 | 51,000 | 53,500 |

Four prepolymers (Examples 1-4) were prepared according to the formulations in Table 4 by following one-step process.

One step synthesis process: All of the raw materials were charged to a clean and dry reactor. The temperature was raised to 120° C. and maintained several minutes until all hydroxyl groups were consumed. Cool down the prepolymer and ready to use.

TABLE 4

|  | Examples | | | |
|---|---|---|---|---|
|  | 1 | 2 | 3 | 4 |
| Acclaim 8200 | 150 | 150 | | |
| GSE 2120 | | | 150 | 150 |
| IPDI | 1.38 | 1.38 | 1.36 | 1.36 |
| Coscat 83 | | 35 ppm | | 20 ppm |
| Fomrez SUL-4 | 35 ppm | | 20 ppm | |
| Silquest A-Link35 | 5.14 | 5.14 | 2.94 | 2.94 |

The stability of the prepolymers (Examples 1-4) toward moisture was evaluated and listed in Table 5. The viscosity of prepolymer made from SUL-4 increased significantly and finally gelled in 3-4 days. Whereas, the viscosity of prepolymer using Coscat 83 only slightly increased even after one (1) month.

TABLE 5

The viscosity change of silylated polyurethane prepolymers exposed to atmospheric moisture

| Example | Time (days) | | | | | | | | |
|---|---|---|---|---|---|---|---|---|---|
|  | 0 | 1 | 2 | 3 | 4 | 8 | 15 | 22 | 32 |
|  | Viscosity (cps) | | | | | | | | |
| 1 | 14,000 | 30,800 | 79,100 | gel | | | | | |
| 2 | 27,800 | 28,300 | 28,100 | 29,000 | 29,100 | 29,000 | 29,600 | 28,800 | 31,400 |
| 3 | 110,000 | 119,000 | 177,000 | 320,000 | gel | | | | |
| 4 | 123,000 | 127,000 | 122,000 | 119,000 | 121,000 | 120,000 | 127,000 | 121,000 | 137,000 |

TABLE 6

| Example | Catalyst for curing | Tensile strength (psi) | Elongation (%) | Hardness (Shore A) |
|---|---|---|---|---|
| 1 | SUL-4 | 80 | 116 | 14.5 |
| 2 | SUL-4 | 82 | 102 | 18 |
| 2 | C83 | 72 | 100 | 15 |
| 3 | SUL-4 | 84 | 210 | 19.7 |
| 4 | SUL-4 | 74 | 170 | 9.6 |
| 4 | C83 | 75 | 200 | 7 |

Examples M through V, listed in Table 7, were prepared using the silylated polyurethane synthesized in Example B (Table 1) using the following none-tin catalyst for silylated polyurethane curing: Coscat 83, aluminum chelate complex (K-Kat 5218), titanic chelate (GBA) zirconium chelate (K-Kat XC 6212).

TABLE 7

None-tin catalyst for silylated polyurethane curing

| Examples | Catalyst for curing | Hardness (shoreA) | Tensile strength (psi) | Elongation (%) | Tack free time |
|---|---|---|---|---|---|
| M | 1% SUL-4 | 27.8 | 134 | 112 | 5 hr |
| N | 1% Coscat 83 | 28.9 | 123 | 97 | 24 hr |
| O | 1% K-Kat 5218 | 27 | 113 | 103 | 6 hr |
| P | 1% K-Kat 6212 | 13 | 49 | 98 | slow |
| Q | 1% GBA | 21.2 | 103 | 84 | 12 hr |
| R | 1% SUL-4 & 1% A-1120 | — | — | — | 0.5 hr |
| S | 1% Coscat 83 & 1% A-1120 | — | — | — | 8 hr |
| T | 1% K-Kat 5218 & 1% A-1120 | — | — | — | 2.5 hr |
| U | 1% K-Kat 6212 & 1% A-1120 | — | — | — | Slow |
| V | 1% GBA & 1% A-1120 | — | — | — | 3 hr |

The prepolymers (examples 1-4) were blended with 1% of bismuth catalyst (Coscat 83) and 1% of tin catalyst (SUL-4), respectively, and then cured in the 50° C./50% relative humidity chamber for seven (7) days. The mechanical properties of these silylated polyurethane prepolymers (Examples 1-4) are listed in Table 6. The results show that the prepolymers cured by Coscat 83 and SUL-4 have similar physical properties.

The results indicated that non-tin catalysts can be used for silylated polyurethane polymer curing. Aluminum chelate complex K-5218 and titanic chelate (GBA) were faster than organic bismuth (Coscat 83) and zirconium chelate (K-Kat XC 6212). The curing speed of silylated polyurethane polymer can be increased by using composite of these catalysts with amine like amino-silane (A-1120).

Obviously, other modifications and variations of the present invention are possible in light of the above teachings. It is, therefore, to be understood that changes may be made in the particular embodiments described above which run within the full intended scope of the invention as defined in the appended claims.

The invention claimed is:

1. A process for making moisture curable silylated polyurethane resin comprising reacting isocyanato-terminated polyurethane prepolymer derived from polyether polyol with an aminoalkoxysilane in the presence of at least one urethane reaction-promoting catalyst selected from the group consisting of bismuth and zinc compounds.

2. The process of claim 1 wherein the isocyanato-terminated polyurethane prepolymer is obtained from the reaction of polyether polyol with a molar excess of polyisocyanate in the presence of at least one urethane reaction-promoting catalyst.

3. The process of claim 1 wherein the isocyanato-terminated polyurethane prepolymer is obtained from the reaction of polyether diol with a molar excess of diisocyanate in the presence of at least one urethane reaction-promoting catalyst.

4. The process of claim 2 wherein the polyether polyol contains up to about 1000 ppm water and the urethane reaction-promoting catalyst is selected from the group consisting of bismuth and zinc compounds, the catalyst remaining in the isocyanato-terminated polyurethane prepolymer to catalyze the reaction of the prepolymer with the aminoalkoxysilane.

5. The process of claim 3 wherein the polyether diol contains up to about 1000 ppm water and the urethane reaction-promoting catalyst is selected from the group consisting of bismuth and zinc compounds, the catalyst remaining in the isocyanato-terminated polyurethane prepolymer product to catalyze the reaction of the prepolymer with the aminoalkoxysilane.

6. The process of claim 4 wherein the polyether diol having a number average molecular weight of at least about 1,000 and having an end group unsaturation level of no greater than 0.04 milliequivalents per gram of polyether diol, and the diisocyanate is selected from the group consisting of diphenylmethane diisocyanate, polymethylene polyphenylisocyanate, paraphenylene diisocyanate, naphthylene diisocyanate, liquid carbodiimide-modified diphenylmethane diisocyanate, isophorone diisocyanate, dicyclohexylmethane-4,4'-diisocyanate, toluene diisocyanate, 2,6-TDI isomer, aliphatic polyisocyanates, aromatic polyisocyanates and mixtures thereof.

7. The process of claim 5 wherein the polyether diol having a number average molecular weight of at least about 1,000 and having an end group unsaturation level of no greater than 0.04 milliequivalents per gram of polyether diol, and the diisocyanate is selected from the group consisting of diphenylmethane diisocyanate, paraphenylene diisocyanate, naphthylene diisocyanate, liquid carbodiimide-modified diphenylmethane diisocyanate, isophorone diisocyanate, dicyclohexylmethane-4,4'-diisocyanate,toluene diisocyanate, 2,6-TDI isomer and mixtures thereof.

8. The process claim 1 wherein the aminoalkylsilane is selected from the group consisting of primaryamino-silane, secondary aminosilane, and mixtures thereof.

9. The process claim 8 wherein the aminoalkylsilane is selected from the group consisting of N-ethyl-3-trimethoxysilyl-2-methyl-propanamine, N,N'-bis((3-trimethoxysilyl)propyl)amine, N-phenyl-gamma-aminopropyltrimethoxysilane, N-(n-butyl)aminopropyltrimethoxysilane), and mixtures thereof.

10. The process of claim 1, wherein the catalyst is an organobismuth compound.

11. The process of claim 1 wherein the catalyst is selected from the group consisting of zinc acetylacetonate, bismuth (2-ethylhexanoate), bismuth neodecanoate, zinc 2-ethylhexanoate, zinc neodecanoate and bismuth tetramethylheptanedioate, bismuth octoate-caprate, or mixtures thereof.

12. The process of claim 10 wherein the catalyst is organobismuth carboxylic acid.

13. The process of claim 1 wherein the urethane reaction-promoting catalysts is used in amounts of from about 0.0005 to about 1.0 part by weight based on 100 parts by weight of the polyol of the formula to prepare moisture curable silylated polyurethane resin.

14. The process of claim 1 wherein the urethane reaction-promoting catalysts is used in amounts of from about 0.001 to about 0.5 parts by weight based on 100 parts by weight of the polyol of the formula to prepare moisture curable silylated polyurethane resin.

15. The process of claim 1 wherein the process temperatures is from about 0° C. to about 150° C.

16. The process of claim 1, wherein the process temperature is from about 30° C. to about 120° C.

17. The process of claim 1 wherein the pressure of the surrounding atmosphere, of the process is from about 900 to about 1100 hPa.

18. The process of claim 1, wherein the composition further comprises optionally at least one of the following substances filler, adhesion promoters, UV stabilizers, antioxidants, pigments and siccatives, crosslinkers, plasticizers, polyethers and polybutenes, or mixture thereof.

19. The process of claim 1, wherein the isocyanato-terminated polyurethane prepolymer is obtained in the presence of catalytically effective amount of at least one bismuth compound.

20. The process of claim 1, wherein the reaction of the isocyanato-terminated polyurethane prepolymer and aminoalkoxysilane is carried out in the absence of a tin-containing compound.

21. A moisture-curable silylated polyurethane resin composition wherein the composition contains at least one curing catalyst selected from the group consisting of bismuth, aluminum, titanium and zinc compounds, wherein the silylated polyurethane resin is made by reacting isocyanato-terminated polyurethane prepolymer and aminoalkoxysilane in the presence of the curing catalyst.

22. A moisture-curable composition comprising a silylated polyurethane resin and at least one curing catalyst selected from the group consisting of bismuth, aluminum, titanium and zinc compounds, wherein the silylated polyurethane resin is made by reacting isocyanato-terminated polyurethane prepolymer and aminoalkoxysilane in the presence of the curing catalyst.

23. A process for making moisture curable silylated polyurethane resin comprising reacting hydroxy-terminated polyurethane prepolymer with an isocyanatoalkoxysilane in the presence of at least one urethane reaction-promoting catalyst wherein the hydroxy terminated polyurethane prepolymer is obtained from the reaction of polyether polyol and polyisocyanate with a molar excess of polyol in the presence of the at least one urethane reaction-promoting catalyst, the polyether polyol contains up to about 1000 ppm water, the reaction of the polyether polyol and polyisocyanate with a molar excess of polyol is carried out in the absence of a tin-containing compound

* * * * *